(12) United States Patent
Wheatley

(10) Patent No.: US 9,294,816 B2
(45) Date of Patent: Mar. 22, 2016

(54) METHODS AND SYSTEMS FOR PREDICTING USER VIEWING PREFERENCES BASED ON DETECTED EVENTS

(71) Applicant: Rovi Guides, Inc., Santa Clara, CA (US)

(72) Inventor: David John Wheatley, Tower Lakes, IL (US)

(73) Assignee: Rovi Guides, Inc., Santa Clara, CA (US)

( * ) Notice: Subject to any disclaimer, the term of this patent is extended or adjusted under 35 U.S.C. 154(b) by 11 days.

(21) Appl. No.: 14/137,747

(22) Filed: Dec. 20, 2013

(65) Prior Publication Data

US 2015/0181289 A1 Jun. 25, 2015

(51) Int. Cl.
*H04N 21/25* (2011.01)
*H04N 21/258* (2011.01)
*H04N 21/2668* (2011.01)
*H04N 21/442* (2011.01)
*H04N 21/45* (2011.01)
*H04N 21/466* (2011.01)
*H04N 21/482* (2011.01)
*H04L 29/08* (2006.01)

(52) U.S. Cl.
CPC .......... *H04N 21/44222* (2013.01); *H04L 67/22* (2013.01); *H04L 67/306* (2013.01); *H04N 21/251* (2013.01); *H04N 21/25891* (2013.01); *H04N 21/2668* (2013.01); *H04N 21/442* (2013.01); *H04N 21/44204* (2013.01); *H04N 21/4532* (2013.01); *H04N 21/466* (2013.01); *H04N 21/4661* (2013.01); *H04N 21/4668* (2013.01); *H04N 21/482* (2013.01)

(58) Field of Classification Search
CPC ... H04N 21/25; H04N 21/251; H04N 21/258; H04N 21/25891; H04N 21/2668; H04N 21/44204; H04N 21/44222; H04N 21/45; H04N 21/4532; H04N 21/466; H04N 21/4661; H04N 21/4826; H04N 21/4668; H04N 21/442; H04N 21/482; H04L 67/22; H04L 67/306
See application file for complete search history.

(56) References Cited

U.S. PATENT DOCUMENTS

| 6,388,714 | B1 | 5/2002 | Schein et al. |
| 6,756,997 | B1 | 6/2004 | Ward, III et al. |
| 7,165,098 | B1 | 1/2007 | Boyer et al. |
| 8,463,796 | B1* | 6/2013 | Freund et al. ................. 707/748 |
| 2002/0104087 | A1* | 8/2002 | Schaffer et al. ................. 725/46 |
| 2002/0120925 | A1 | 8/2002 | Logan |
| 2002/0174430 | A1 | 11/2002 | Baumgartner et al. |
| 2003/0115589 | A1* | 6/2003 | D'Souza et al. ................ 725/10 |
| 2005/0251827 | A1 | 11/2005 | Ellis et al. |
| 2007/0206741 | A1* | 9/2007 | Tiliks et al. ............. 379/106.02 |
| 2010/0153885 | A1 | 6/2010 | Yates |
| 2011/0090898 | A1* | 4/2011 | Patel et al. .................... 370/352 |
| 2012/0110071 | A1* | 5/2012 | Zhou et al. .................... 709/204 |
| 2014/0088952 | A1* | 3/2014 | Fife et al. .......................... 704/9 |
| 2014/0123165 | A1* | 5/2014 | Mukherjee et al. ............. 725/14 |
| 2014/0143804 | A1* | 5/2014 | Cheng et al. ................... 725/34 |
| 2014/0280236 | A1* | 9/2014 | Faller et al. ................... 707/749 |

FOREIGN PATENT DOCUMENTS

WO WO 2013/088307 6/2013

* cited by examiner

*Primary Examiner* — Randy Flynn
(74) *Attorney, Agent, or Firm* — Ropes & Gray LLP

(57) ABSTRACT

Methods and systems are disclosed herein for a media guidance application that predicts user preferences based on detected events. For example, in response to a trigger, the media guidance application may monitor data associated with a user. The media guidance application may then process the monitored data to determine if the monitored data indicates that a user profile of a user should be updated.

20 Claims, 5 Drawing Sheets

METHODS AND SYSTEMS FOR PREDICTING USER VIEWING PREFERENCES BASED ON DETECTED EVENTS

BACKGROUND

In conventional systems, information about a user (e.g., the programs, movies, genres, etc. that a user enjoys) is often tracked. The tracked information, typically contained in a user profile, may then be used by a wide variety of entities to suggest or recommend content.

Despite the widespread use of tracking user information, the way the information is gathered is very reactionary. For example, in conventional systems, content a user has previously watched is used to determine content a user would like to watch. As the user begins watching different content (e.g., different television shows), the user profile gradually changes to reflect the different content. Therefore, the user profile in conventional systems is a better indicator of content that a user has previously preferred, not content that a user currently prefers or will prefer.

SUMMARY

Accordingly, methods and systems are disclosed herein for a media guidance application that predicts preferences of users based on detected events. As the media guidance application predicts user preferences based on detected events, instead of past behavior, the user profile generated by the media guidance application is a better indicator of content that a user currently prefers or will prefer than user profile generated by tracking prior behavior of a user.

For example, in response to a trigger (e.g., a request for content that is inconsistent with the user profile of a user), the media guidance application may monitor data (e.g., posting of the user to a social media network) associated with a user. The media guidance application may then process the monitored data to determine if the monitored data indicates (e.g., preference altering real life events such as the user is engaged, the user is having a child, etc.) that a user profile of a user should be updated.

In some aspects, the media guidance application stores first user viewing preferences for a first user and may detect an activity performed by the first user that is inconsistent with the user viewing preferences. In response to detecting the activity, the media guidance application identifies a first event, associated with the first user, that is posted on a server within a threshold period of time of the activity that corresponds to the inconsistency, in which the server makes the first event accessible to a second user. In response to identifying the first event, the media guidance application determines user preference criteria based on the first event, and updates the first user viewing preferences with the user preference criteria such that the activity performed by the first user becomes consistent with the updated first user viewing preferences. In some embodiments, the media guidance application may further generate a display of media content based on the updated first user viewing preferences.

In some embodiments, the media guidance application, in response to identifying the first event, may monitor events posted to a server by a second user for a second event that corresponds to the first event, and in response to detecting the second event, the media guidance application updates a second user viewing preferences with the user preference criteria. For example, after identifying an event that indicates that the viewing preferences for a first user are changing, the media guidance application may monitor other users for the same event. The media guidance application may then update the viewing preferences for a second user if the media guidance application determines that the same event occurred (e.g., based on common keywords associated with both events) with respect to the second user. Furthermore, in some embodiments, the media guidance application may monitor and/or apply changes to the user preferences of the second user in response to determining that the first user and the second user are associated with the same demographic, familial, or social network group.

The media guidance application may identify the first event in numerous ways. In some embodiments, the media guidance application may identify the first event in response to determining a threshold number of users, each having corresponding activities and corresponding events posted on a server within a threshold period of time of their respective activities. For example, if a greater number of people exhibit similar viewing preference changes near similar events, respectively, the media guidance application may determine that the user preference change is caused by the similar events. In some embodiments, the media guidance application may determine that the first event corresponds to the inconsistency based on cross-referencing the inconsistency in a database associated with events likely to cause inconsistent activities, and determining that the first event corresponds to one of the events likely to cause inconsistent activities.

In some embodiments, the media guidance application may cross-reference the first event with a database associated with user preference criteria to determine the user preference criterion that corresponds to the first event. For example, in response to detecting that an event is associated with an inconsistent activity, the media guidance application may determine the particular user preference criterion that corresponds to the first event. By applying that user preference criterion to the first user viewing preferences, the media guidance application may update the first user viewing preferences such that the activity performed by the first user becomes consistent.

In some embodiments, detecting that the activity performed by the first user that is inconsistent with the user viewing preferences further includes the media guidance application determining a number of times the activity was performed by the first user. The media guidance application may then compare the number of times the activity was performed to a threshold number and identify the first event in response to determining that the number of times the activity was performed corresponds to the threshold number.

In some embodiments, detecting that the activity performed by the first user that is inconsistent with the user viewing preferences further includes the media guidance application determining a length of time during which the activity was performed by the first user. The media guidance application may then compare the length of time during which the activity was performed to a threshold length of time and identify the first event in response to determining that the length of time during which the activity was performed corresponds to the threshold length of time.

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
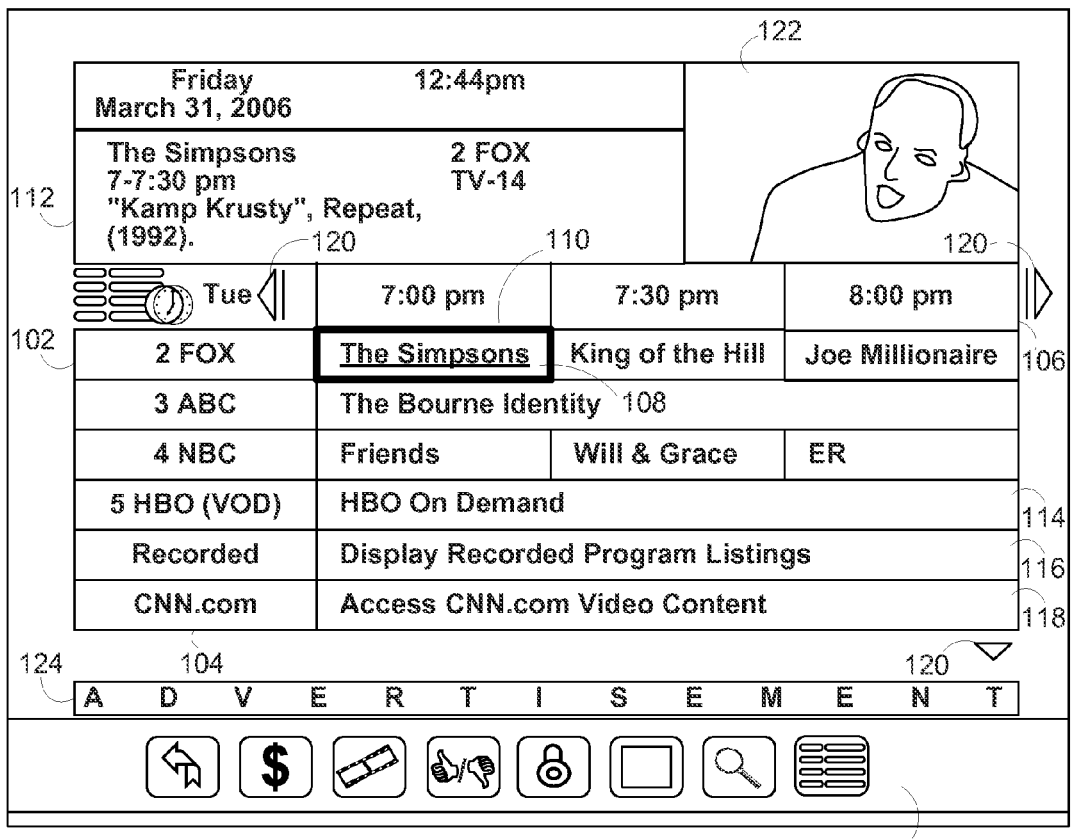
FIG. 1 is an illustrative display of a media guidance application in accordance with some embodiments of the disclosure.

Methods and systems are disclosed herein for a media guidance application that predicts user preferences based on detected events. As used herein, a "media guidance application," sometimes, "an interactive media guidance application," or "a guidance application," refers to an interface that allows users to efficiently navigate content selections and easily identify content that they may desire.

Media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

In some embodiments, the media guidance application stores user viewing preferences for a user. The media guidance application may be personalized based on the user viewing preferences. A personalized media guidance application allows a user to receive custom displays, features, and content recommendations, to create a personalized "experience" with the media guidance application. This personalized experience may be created by allowing a user to input these customizations and/or by the media guidance application monitoring user activity to determine various user preferences. Users may access their personalized media guidance application by logging in or otherwise identifying themselves to the media guidance application. Customization of the media guidance application may be made in accordance with a user profile.

As referred to herein, "a user profile" refers to a collection of user preference criteria that represents the user preferences of a user. In some embodiments, the user preferences of the user may include user viewing preferences, which are user preferences related to the consumption of media assets. In some embodiments, individual preferences may be defined by individual user preference criterion. It should be noted that user preference criteria may include any criterion related to any preference of a user, including, but not limited to, user viewing preferences.

For example, the preferences indicated by user preference criteria may define characteristics for varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.), preferred content, including, but not limited to preferred genre, actors, or any other attribute associated with content, and other desired customizations related to the consumption of media that are preferred by a user.

The media guidance application may allow a user to provide user preference criteria or may automatically compile user preference criteria. The media guidance application may, for example, monitor the content the user accesses and/or other interactions the user may have with the media guidance application. Additionally, the media guidance application may obtain all or part of other user profiles, including user preference criteria, that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified media guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Baumgartner et al., U.S. Patent Application Publication No. 2002/0174430, published Nov. 21, 2002, which are hereby incorporated by reference herein in their entireties.

In addition to monitoring the content the user accesses and/or other interactions the user may have with the media guidance application, the media guidance application may monitor activities associated with a user for consistency with the user preferences in the user profile. As used herein, "an activity" refers to the consumption of a media asset. In some embodiments, an activity may relate to the consumption of a media asset originating from a third party. For example, the viewing of a television program, webcast, or streamed audio generated by a third party may constitute an activity.

As used herein, an activity is "consistent" with a user profile, or the user preferences contained in a user profile, if the user profile predicts that a user would enjoy, or enjoy to a particular degree, the media asset associated with the activity. Likewise, an activity is "inconsistent" with a user profile, or the user preferences contained in a user profile, if the user profile predicts that a user would not enjoy, or not enjoy to a particular degree, the media asset associated with the activity.

For example, if a user preference criteria indicate that a user enjoys "horror" movies, but does not enjoy "action" movies, and the user views a "horror" movie, the activity is consistent. In contrast, if the user preference criteria indicate that a user enjoys "horror" movies, but does not enjoy "action" movies, and the user views an "action" movie, the activity is inconsistent. Likewise, if the user preference criteria indicate that there is an eighty percent chance that a user selects a "horror" movie, and a ten percent chance that the user selects an "action" movie, and the user selects the "horror" movie, the activity is consistent. Whereas, if the user preference criteria indicate that there is an eighty percent chance that a user selects a "horror" movie, and a ten percent chance that the user selects an "action" movie, and the user selects the "action" movie, the activity is inconsistent.

In another example, if user preference criteria indicate that the favorite actors of the user are Actors A, B, and C, and the user selects a television program with only Actor A, the activity of the user is consistent. In contrast, if user preference criteria indicate that the favorite actors of the user are Actors A, B, and C, but the user selects a television program with only Actor D, the activity of the user is inconsistent.

In some embodiments, the media guidance application may update the first user viewing preferences of a user with the user preference criteria such that an inconsistent activity performed by the first user becomes consistent with the updated first user viewing preferences. For example, if user preference criteria indicate that user enjoys movies about weddings on Friday nights, and the user selects a television program about weddings on Saturday morning, the activity may be inconsistent. The media guidance application may update the user profile such that the user preference criteria indicate that user enjoys movies about weddings on Friday nights and television program about weddings on Saturday mornings.

In some embodiments, the media guidance application may update the user preferences of a user with multiple user preference criteria extrapolated from an inconsistency. For example, in the previous example, in addition to updating the user profile such that the user preference criteria indicate that the user enjoys movies about weddings on Friday nights and television program about weddings on Saturday mornings, the media guidance application may update the user profile such that the user preference criteria indicate that the user enjoys movies or television programs about weddings, enjoys movies about weddings on Friday nights or Saturday mornings, and/or the user enjoys content with the same subject matter in the morning as the content viewed the night before.

In another example, if the user preference criteria indicate that there is an eighty percent chance that a user watches a movie in high definition, and a twenty percent chance that the user watches a movie in standard definition, and the user selects to watch a movie in high definition, the media guidance application may raise the percent chance that the user watches a movie in high definition (or lower the percent chance the user watches the movie in standard definition). In contrast, if the user selects to watch the movie in standard definition, the media guidance application may lower the percent chance that the user watches a movie in high definition (or raise the percent chance the user watches the movie in standard definition).

In some embodiments, detecting that an activity performed by a user is inconsistent with the user preferences of a user, triggers the media guidance application to identify a cause associated with the inconsistency. In such cases, the media guidance application may identify an event, associated with the user that corresponds to the inconsistency.

As referred to herein, "an event" refers to content generated by a user and/or in response to a user action. For example, events include, but are not limited to, messages, calendar entries, postings, status updates, and/or any other content authored by the user. In some embodiments, events may include content generated by a user for presentation on a social network or for sharing via social media.

For example, a status update indicating that a user was recently engaged may be used by the media guidance application to update the user preferences (e.g., to include content targeted at recently engaged persons and/or content determined to be typically consumed by recently engaged persons) of a user in response to detecting inconsistent activity (e.g., an increase in the viewing of wedding programs). In another example, a calendar entry indicating that a user received a date request at an Italian restaurant not of the user's choosing from another user may be used by the media guidance application to maintain the user preferences of the user (e.g., not update the user preferences), which indicates a user does not enjoy Italian food, in response to detecting inconsistent activity (e.g., the user eating at an Italian restaurant).

In some embodiments, an event may relate to a real life event. As used herein, "a real life event" refers to an occurrence in the life of a user. In some embodiments, a real life event may be determined by the media guidance application based on data associated with an event as described herein. It should be noted, that embodiments related to events may also relate to real life events. For example, if the media guidance application determines a user preference criterion based on an identified event (e.g., a post to a social network describing what happened to a user that day), the media guidance application may also determine the content or context of the identified event (e.g., identify what happened to the user that day). The media guidance application may then determine a user preference criterion based on the real life event and update the user preferences as described herein.

In some embodiments, an event may relate to a physiological or psychological condition of a user. For example, a microblog entry generated by a user may indicate that the user is depressed, feeling sick, etc. In some embodiments, these conditions may be determined by the media guidance application based on data associated with an event as described herein. Furthermore, it should be noted, embodiments related to events may also relate to physiological or psychological conditions of a user. For example, if media guidance application determines a user preference criterion based on an identified event (e.g., a post to a social network describing a physiological or psychological condition of a user), the media guidance application may also determine the content or context of the identified event (e.g., identify the physiological or psychological conditions of a user). The media guidance application may then determine a user preference criterion based on the physiological or psychological conditions of the user and update the user preferences as described herein.

In some embodiments, an event may relate to a new interest of a user. For example, a digitally shared graphic may indicate that the user has recently discovered a love for post-modern art. For example, a pinboard-style photo-sharing web-site may allow users to create and manage theme-based image collections such as interests or hobbies. The media guidance application may monitor the events related to the web-site to identify new interests or hobbies of the user. It should be noted, embodiments related to events may also relate to interests or hobbies. For example, if a media guidance application determines a user preference criterion based on an identified event (e.g., a post or a submission to the web-site indicating a new interest), the media guidance application may also determine the content or context of the identified submission. The media guidance application may then determine a user preference criterion based on the content or context of the submission as described herein.

In some embodiments, when identifying an event that corresponds to the inconsistent activity, the media guidance application may limit its search to a threshold period of time. As used herein, "a threshold period of time," refers to a finite amount of time with a determined beginning and end point. For example, the media guidance application may compare the time of an inconsistent activity (e.g., eight o'clock to nine o'clock) to the time associated with events of the user (e.g., nine o'clock, ten o'clock, ten-thirty, etc.). For example, when attempting to identify an event corresponding to an inconsistent activity that occurred, the media guidance application may only process events that occurred within a few days, hours, and/or any other time metric of the inconsistent activity. The media guidance application may also consider the chronological order of events relative to activities. For example, in order to identify an event that caused a user to perform an inconsistent activity, the media guidance application may only search for events occurring before the inconsistent activity.

In some embodiments, the media guidance application may determine the likelihood that an event corresponds to an inconsistent activity based on the proximity of the event to the inconsistent activity. For example, if a first event occurred within a few hours of an inconsistent activity, the media guidance application may determine the likelihood that the first event corresponds to the inconsistent activity higher than that of a second event that occurred over a month after the inconsistent activity.

In some embodiments, the media guidance application may compare the proximity of several inconsistent activities to the proximity of one or more events. In addition, the media guidance application may determine similarities between activities and/or events. For example, the media guidance application may determine that three inconsistent activities are all related (e.g., relate to performing the same activity). The media guidance application may also determine that a series of three events are all related (e.g., three microblog posts featuring the same keywords). In response the media guidance application may determine if there is a correlation between the proximity of the three inconsistent activities and the each of the series of events, respectively.

In some embodiments, the threshold period of time may be determined by a user or may be automatically selected by the media guidance application. Furthermore, in some embodiments, the media guidance application may vary the threshold period of time based on the number of occurrences of the inconsistent activities, user settings, the length of time of the inconsistent activities, prior history of the user related to any inconsistent activities, the nature of the inconsistent activity, any/or any other factor that may bear on determining the event that corresponds to an inconsistent activity.

In some embodiments, the media guidance application may only identify events that are associated with a social network account of a user and/or social sharing of the user. In such cases, the media guidance application may search for events posted on a server in which the server makes the first event accessible to a second user. For example, the server may be a social media server owned/operated/used by social media provider that makes posting of a first event associated with a first user accessible to a second user that is within the same social network as the first user. In some embodiments, the media guidance application may retrieve a list of other users that are associated with the user based on one or more criteria. For example, the media guidance application may retrieve a list of friends (e.g., a social network buddy list), contacts (e.g., retrieved from a phone or e-mail account associated with the user), and/or other listings featuring other users associated with the user.

The media guidance application may identify the first event in numerous ways. In some embodiments, the media guidance application may identify the first event in response to determining a threshold number of users, each have corresponding activities and corresponding events posted on the server within the threshold period of time of their respective activities. For example, if a larger number of people exhibit a similar viewing preference change near a similar event, the media guidance application may determine that the viewing preference change is caused by the event. After the media guidance application determines that the first event corresponds to the inconsistency based on cross-referencing the inconsistency in a database associated with events likely to cause inconsistent activities, the media guidance application determines whether the first event corresponds to one of the events likely to cause inconsistent activities.

In some embodiments, detecting that the activity performed by the first user that is inconsistent with the user viewing preferences further includes the media guidance application determining a number of times the activity was performed by the first user. The media guidance application may then compare the number of times the activity was performed to a threshold number and identify the first event in response to determining that the number of times the activity was performed corresponds to the threshold number. For example, the media guidance application may only detect an inconsistency, if the inconsistency appears a particular number of times.

In some embodiments, detecting that the activity performed by the first user that is inconsistent with the user viewing preferences further includes the media guidance application determining a length of time during which the activity was performed by the first user. The media guidance application may then compare the length of time during which the activity was performed to a threshold length of time and identify the first event in response to determining that the length of time during which the activity was performed corresponds to the threshold length of time. For example, the media guidance application may only detect an inconsistency, if the inconsistency appears for a particular length of time.

It should be noted that in some embodiments, the media guidance application may use multiple methods for identifying an event associated with an inconsistent activity. For example, in order to reduce false positives (e.g., the identification of events corresponding to inconsistent activities that do not actually correspond to inconsistent activities), the media guidance application may use a combination of methods to identify events associated with an inconsistent activity.

In some embodiments, the media guidance application may cross-reference an identified event with a database associated with user preference criteria to determine the user preference criterion that corresponds to the identified event. For example, by applying that user preference criterion to the user preferences, the media guidance application may update the user preferences such that the activity performed by the first user becomes consistent. The updated user preferences may then be used to predict preferences of a user (e.g., for use in recommending content), to generate a user profile indicative of content that a user currently prefers or will prefer.

In some embodiments, the media guidance application may use correlations determined between an activity and event associated with one user to update user preferences of another user. For example, the media guidance application, in response to identifying a first event, may monitor events posted to a server (e.g., the social media server) by a second user for a second event that corresponds to the first event, and in response to detecting the second event, the media guidance application may update second user preferences with user preference criteria corresponding to the event. For example, after identifying an event that indicates that the user preferences for a first user are changing, the media guidance application may monitor other users for the same event.

In some embodiments, the media guidance application may only update the viewing preferences for other users if the media guidance application determines that the same event occurred (e.g., based on common keywords associated with both events) with respect to both users. Furthermore, in some embodiments, the media guidance application may only monitor and/or apply changes to the user preferences of other users in response to determining that both users are associated with the same demographic, familial, or social network group.

In some embodiments, a user preference criterion based on an event may include an expiration date (e.g., a date when the added user preference criterion should be removed from the user preferences). For example, in response to detecting a particular event (e.g., pregnancy of the user) the media guidance application may update the user preferences with a corresponding user preference criterion (e.g., indicating that the user is pregnant). Accordingly, the user may begin to receive media recommendations related to pregnancy. However, the media guidance application may also determine (e.g., based on a cross-reference with a database associated with events) that this event is associated with an expiration date (e.g., a date when the user preference criterion should no longer be applied to the user preferences). In this case, the expiration date may correspond to nine months from the date of the event (e.g., corresponding to the length of the pregnancy). When the expiration date is reach, the media guidance application may no longer apply the user preference criterion to the user preferences.

In another example, the media guidance application may determine that an event relates to a user being sick. The media guidance application may further determine the reason the user is sick (e.g., a cold). The media guidance application may further determine that this type of sickness is usually over in a few days. Therefore, the media guidance application may establish an expiration date for this user preference criterion as a few days later.

Additionally or alternatively, the media guidance application may apply one or more conditions to the user preference criterion. For example, a condition may indicate that the user preference criterion should be applied to the user preferences until a subsequent event is detected (e.g., an event indicating that the user gave birth). The media guidance application may then monitor (e.g., either continually or periodically) for the subsequent event. In response to detecting the subsequent event, the media guidance application may remove the initial user preference criterion (e.g., associate with pregnancy) and/ or automatically apply another user preference criterion (e.g., associated with caring for infants).

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

In some embodiments, the media guidance application may be provided as an on-line application (i.e., provided on a website), or as a stand-alone application on a server, user device, etc. Various devices and platforms that may implement the media guidance application are described in more detail below. In some embodiments, the media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media card, register memory, processor caches, Random Access Memory ("RAM"), etc.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
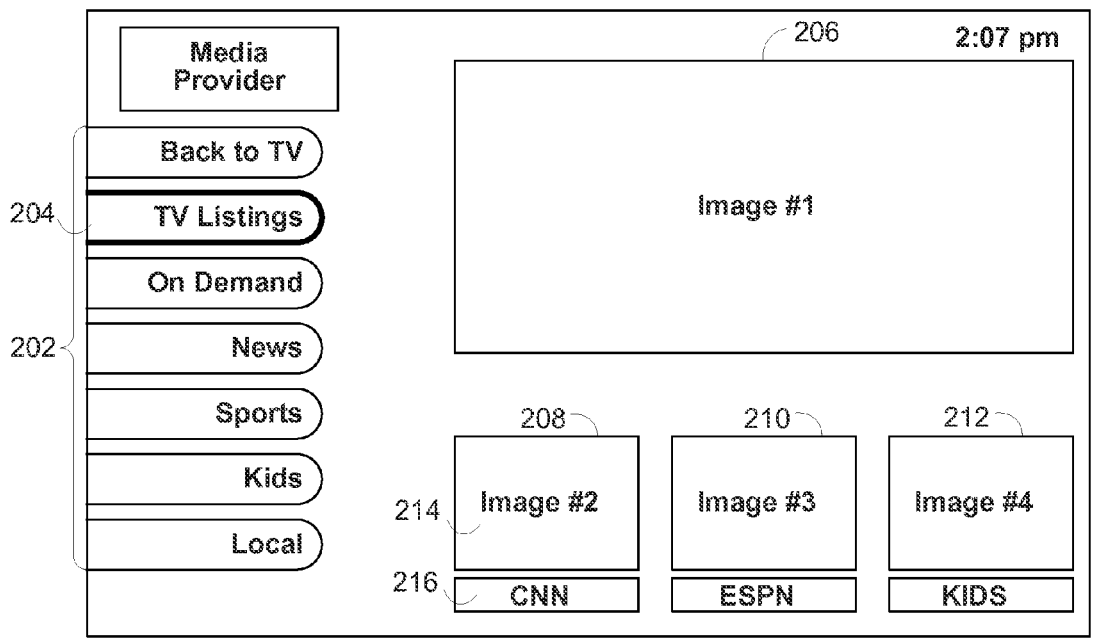
FIG. 2 is another illustrative display of a media guidance application in accordance with some embodiments of the disclosure.

FIGS. 1-2 show illustrative display screens that may be used to provide media guidance data. The display screens shown in FIGS. 1-2 and 5-15 may be implemented on any suitable user equipment device or platform. While the displays of FIGS. 1-2 and 5-15 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, published Jun. 17, 2010, which is hereby incorporated by reference herein in its entirety.

Figure 3:
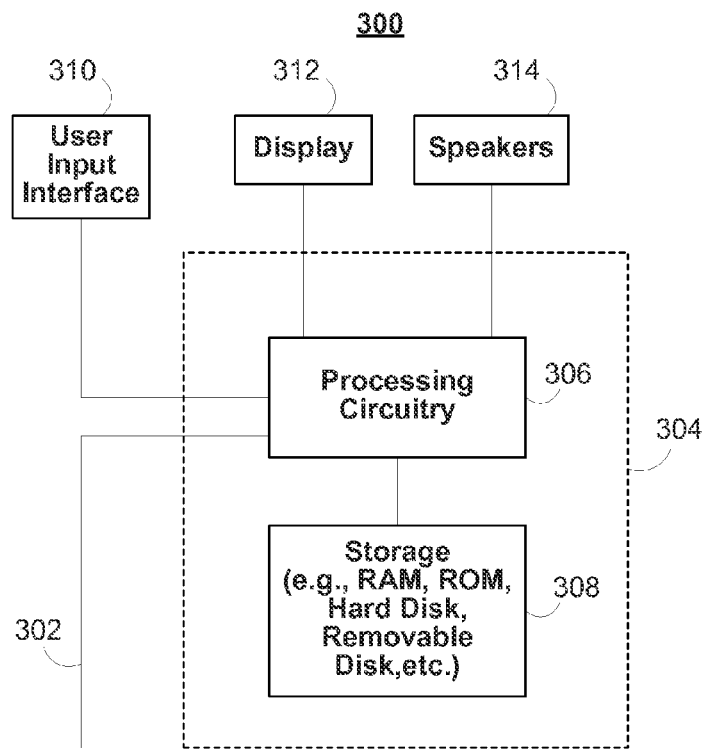
FIG. 3 is a block diagram of an illustrative system used in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
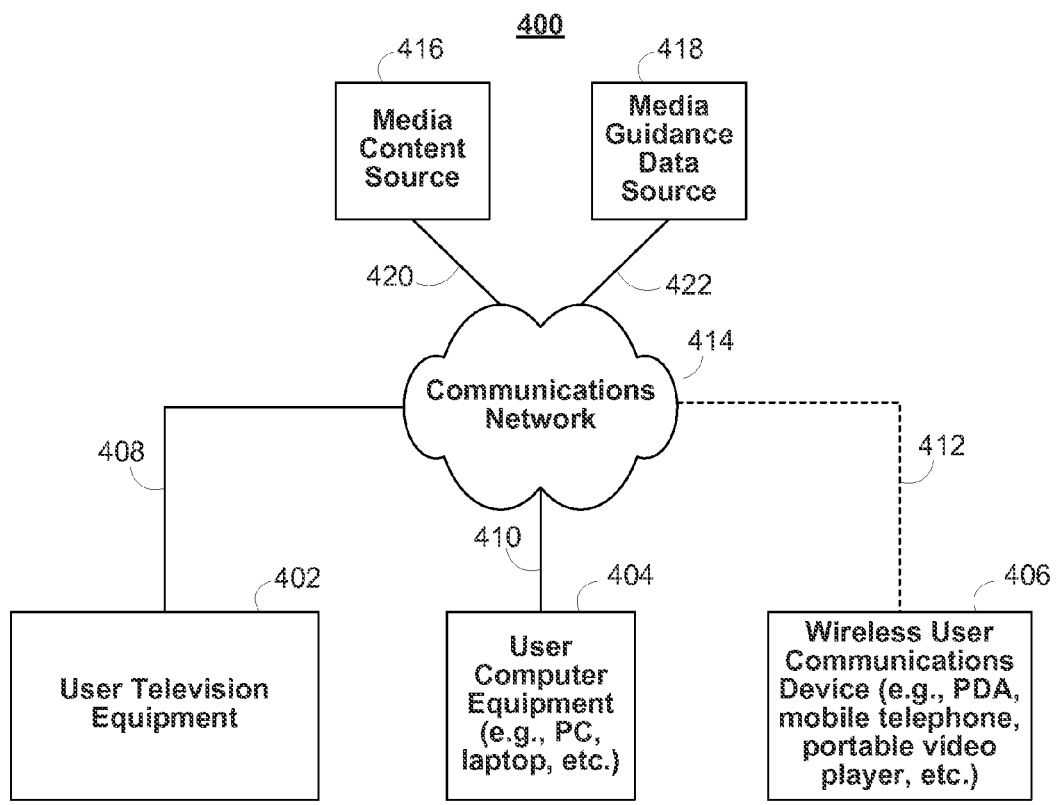
FIG. 4 is an illustrative diagram of a media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution equipment, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
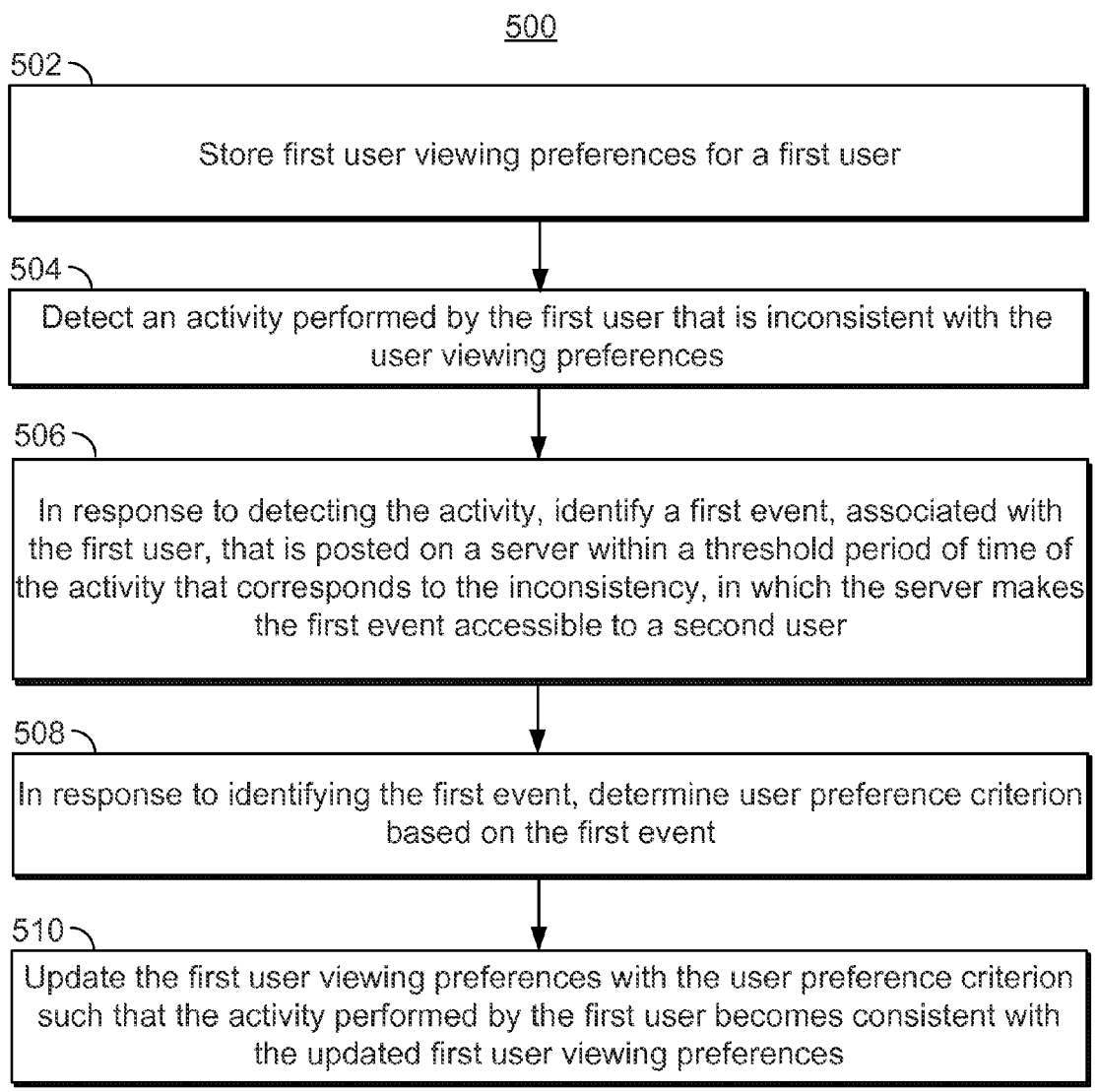
FIG. 5 is a flowchart of illustrative steps involved in updating user viewing preferences based on detected events in accordance with some embodiments of the disclosure.

FIG. 5 is a flowchart of illustrative steps involved in updating user viewing preferences based on detected events in accordance with some embodiments of the disclosure. It should be noted that process 500 or any step thereof could be performed on, or provided by, any of the devices shown in FIGS. 3-4. For example, process 500 may be executed by control circuitry 304 (FIG. 3) as instructed by a media guidance application implemented on user equipment 402, 404, and/or 406 (FIG. 4) in order to provide content as described in the displays of FIGS. 1 and 2. In addition, one or more steps of process 500 may be incorporated into or combined with one or more steps of any other process or embodiment (e.g., process 600 (FIG. 6) or process 700 (FIG. 7)).

At step 502, the media guidance application stores first user viewing preferences for a first user. For example, as explained above, the media guidance application (e.g., via control circuitry 304 (FIG. 3)) may receive user preference criteria (e.g., entered via a selectable options 202 (FIG. 2)) or may automatically compile user preference criteria (e.g., based on monitoring activities of the user with the media guidance application). In some embodiments, the media guidance application (e.g., via control circuitry 304 (FIG. 3)) may store the first user viewing preferences locally (e.g., at storage 308 (FIG. 3)). Additionally or alternatively, the media guidance application (e.g., via I/O path 302 (FIG. 3)) may retrieve all or part of the user preferences, including user preference criteria, that are related to a particular user from a remote source (e.g., media guidance data source 418 (FIG. 4)) and/or any location accessible via communications network 414 (FIG. 4)).

At step 504, the media guidance application detects an activity performed by the first user that is inconsistent with the user viewing preferences. For example, in addition to monitoring activities of the user, the media guidance application (e.g., via control circuitry 304 (FIG. 3)) may extract information about those activities. For example, data (e.g., metadata) transmitted with a media asset may indicate the information (e.g., a genre, subject matter, etc. associated with the media asset) used to compare and compile user preference criteria. Additionally or alternatively, in response to receiving a user request for a media asset, the media guidance application (e.g., via control circuitry 304 (FIG. 3)) may retrieve/request the information from a database located locally (e.g., at storage 308 (FIG. 3)) or a remotely (e.g., located at media guidance data source 418 (FIG. 4) and/or any location accessible via communications network 414 (FIG. 4)).

For example, a database accessible by the media guidance application (e.g., via control circuitry 304 (FIG. 3)) may indicate various types of information used to compare and compile user preference criteria for all available media assets. The media guidance application (e.g., via control circuitry 304 (FIG. 3)) may input the media asset associated with the activity and the database may output a listing of the information. Additionally or alternatively, the media guidance application may retrieve/receive a listing of the user preference criteria associated with the media asset.

Upon retrieval/receipt, the media guidance application may compare the information or the user criteria associated with the media asset to the user preference criteria of the user preferences. In response to determining that the user criteria associated with the media asset and the user preference criteria of the user preferences do not correspond, the media guidance application (e.g., via control circuitry 304 (FIG. 3)) may determine that the media asset is inconsistent.

Additionally or alternatively, the media guidance application may determine the information associated with the activity by applying one or more content recognition techniques to the media asset associated with the activity. For example, media guidance application (e.g., via control circuitry 304 (FIG. 3)) may use a content recognition module or algorithm to generate data describing the context, content, and/or any other data necessary for determining whether or not a media asset is consistent with user preferences. For example, the content recognition module may use object recognition techniques such as edge detection, pattern recognition, including, but not limited to, self-learning systems (e.g., neural networks), optical character recognition, on-line character recognition (including but not limited to, dynamic character recognition, real-time character recognition, intelligent character recognition), and/or any other suitable technique or method to determine objects in the media asset. For example, the media guidance application may receive data in the form of a video. The video may include a series of frames. For each frame of the video, the media guidance application may use a content recognition module or algorithm to determine the objects (e.g., people, places, things, etc.) in each of the frames or series of frames, which may be used to determine whether or not a media asset is consistent with a user preference criteria. For example, based on the detection of a multitude of explosions in the frames, the media guidance application may determine the video is of the "action" genre. The media guidance application may then compare this determination to the user preference criteria.

In some embodiments, the content recognition module or algorithm may also include speech recognition techniques, including, but not limited to, Hidden Markov Models, dynamic time warping, and/or neural networks (as described above) to translate spoken words into text and/or processing audio data. The content recognition module may also combine multiple techniques to determine whether or not a media asset is consistent with user preferences.

In addition, the media guidance application may use multiple types of optical character recognition and/or fuzzy logic, for example, when processing keyword(s) retrieved from data (e.g., textual data, translated audio data, user inputs, etc.) describing the media asset (or when cross-referencing various types of data in databases). For example, if the particular data received is textual data, using fuzzy logic, the media guidance application (e.g., via a content recognition module or algorithm incorporated into, or accessible by, the media guidance application) may determine two fields and/or values to be identical even though the substance of the data or value (e.g., two different spellings) is not identical. In some embodiments, the media guidance application may analyze particular received data of a data structure or media asset frame for particular values or text using optical character recognition methods described above in order to determine whether or not a media asset is consistent with user preferences. The data received could be associated with data describing whether or not a media asset is consistent with user preferences and/or any other data required for the function of the embodiments described herein.

At step 506, the media guidance application, in response to detecting the activity, identifies a first event, associated with the first user, that is posted on a server within a threshold period of time of the activity that corresponds to the inconsistency, in which the server makes the first event accessible to a second user. For example, in response to determining (e.g., via control circuitry 304 (FIG. 3)) that an activity performed by the user is inconsistent with the user preferences, the media guidance application (e.g., via control circuitry 304 (FIG. 3)) attempts to identify an event that may reveal the cause of the inconsistency.

For example, the media guidance application may search events that are associated with a social network account of a user and/or social sharing of the user. As events posted by a user to a social media account are often good indicators of the mood, habits, and preferences, and/or the reason thereof, the media guidance application may search for events posted to a social media server (e.g., a server that makes the first event, shared by the first user accessible to a second user).

Figure 7:
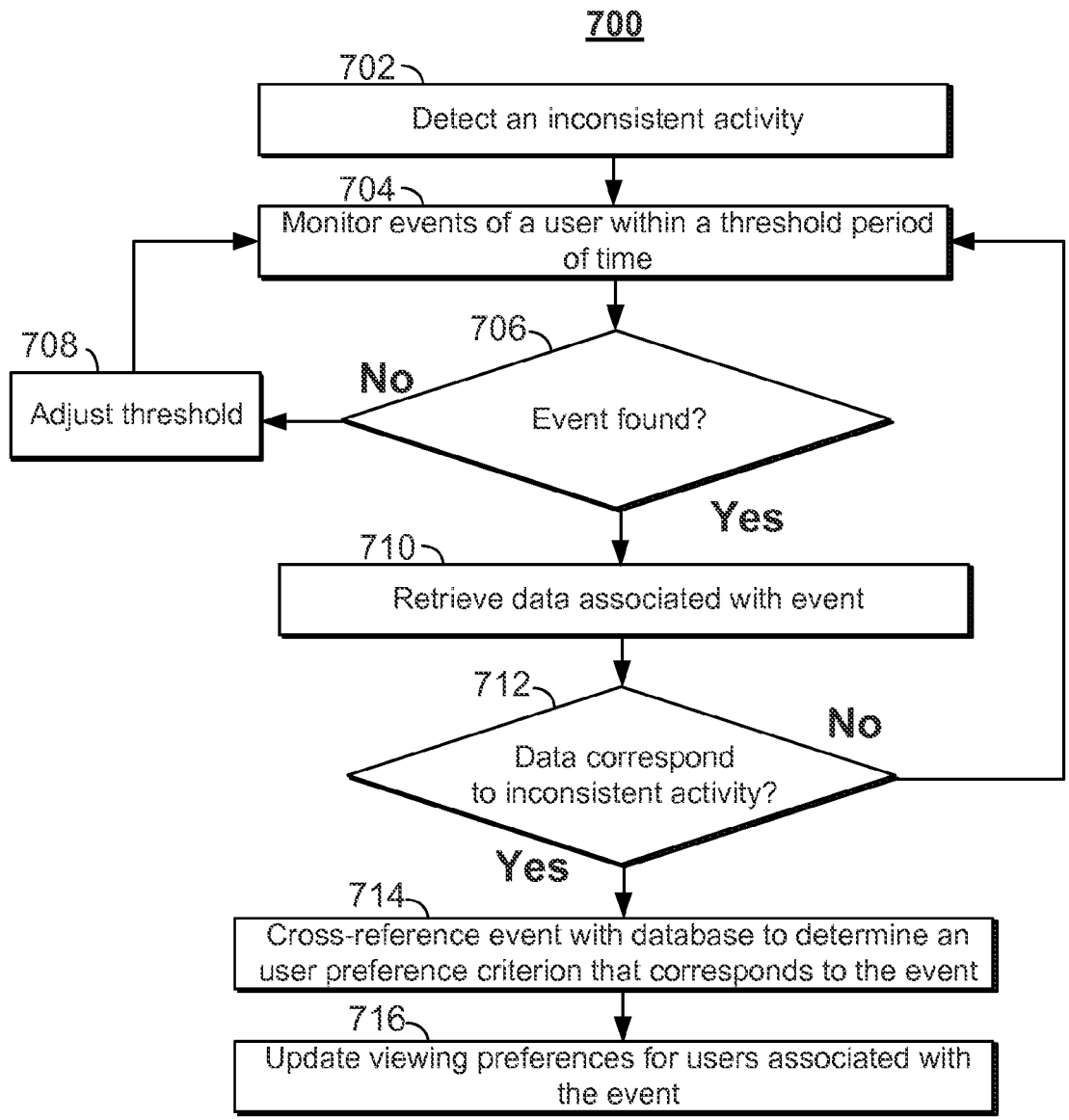
FIG. 7 is a flowchart of illustrative steps involved in updating user viewing preferences based on events in accordance with some embodiments of the disclosure.

As described in relation to FIG. 7, the media guidance application may limit its search to a particular threshold period of time and identify a correlation between an inconsistent activity and an event via numerous techniques. For example, the media guidance application may determine the date of an inconsistent activity (e.g., Monday) and search that date for events associated the user. In some embodiments, the media guidance application (e.g., via control circuitry 304 (FIG. 3)) may determine the likelihood that an event corresponds to an inconsistent activity based on the proximity of the event to the inconsistent activity. For example, if a first event occurred within a few hours of an inconsistent activity, the media guidance application may determine the likelihood that the first event corresponds to the inconsistent activity higher than that of a second event that occurred over a month after the inconsistent activity. The media guidance application may then compare the determined likelihood to a threshold likelihood. In response to determining that the determined likelihood corresponds to the threshold likelihood, the media guidance application (e.g., via control circuitry 304 (FIG. 3)) determines the event associated with the likelihood relates to the inconsistent activity.

At step 508, the media guidance application, in response to identifying the first event, determines user preference criterion based on the first event. For example, a database accessible by the media guidance application may indicate various types of information used to compare and compile user preference criteria for various events. The media guidance application (e.g., via control circuitry 304 (FIG. 3)) may input the event and the database may output a listing of the information. Additionally or alternatively, the media guidance application may retrieve/receive a listing of the user preference criteria associated with the event.

In some embodiments, the media guidance application may extract data associated with the event (e.g., keywords from a textual posting) that indicate a context or content associated with the event (e.g., a real life event that occurred). In such cases, the data may be cross-referenced with a database to determine the user preference criteria associated with the event. For example, the media guidance application may use one or more of the content recognition techniques discussed above in order to determine the content or context of an event (e.g., the real life event that occurred).

At step 510, the media guidance application updates the first user viewing preferences with the user preference criterion such that the activity performed by the first user becomes consistent with the updated first user viewing preferences. For example, the media guidance application (e.g., via control circuitry 304 (FIG. 3)) determines the user preference criteria, or lack thereof (e.g., as described above), that caused the media asset associated with the activity to be deemed inconsistent and alters, adds, or removes the determined user preference criteria so that the activity is consistent with the user preferences.

For example, the media guidance application may determine that a real life event occurred (e.g., a user got married). In response the media guidance application may update the first user viewing preferences with a user preference criterion (e.g., indicating the user was recently married). Based on this update, the first user viewing preferences will no longer consider the inconsistent activity (e.g., a program for recently married users) inconsistent. Furthermore, the media guidance application may recommend programming for users based on the updated first user viewing preferences.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one of more of the steps in FIG. 5.

Figure 6:
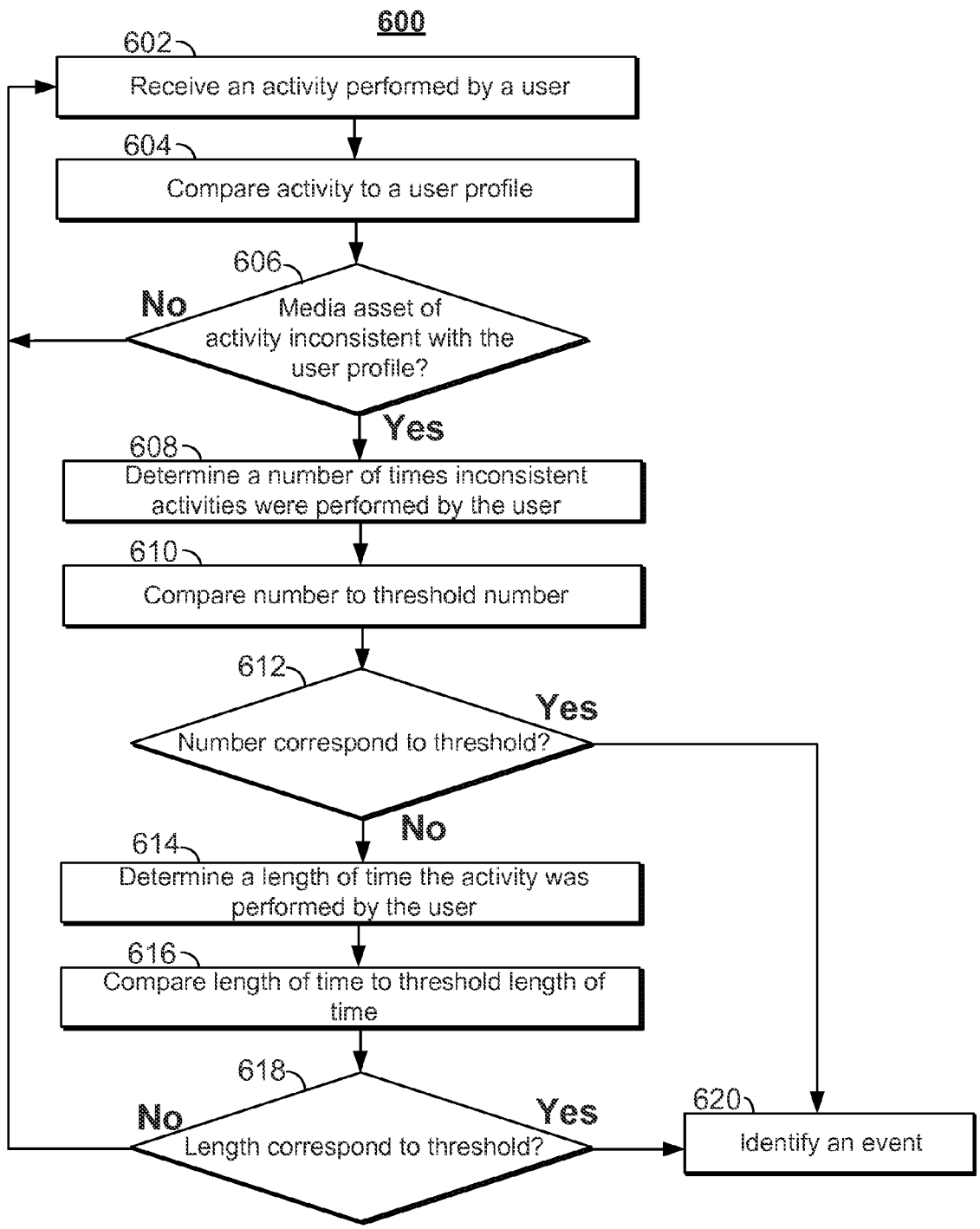
FIG. 6 is a flowchart of illustrative steps involved in identifying an event associated with an inconsistent activity in accordance with some embodiments of the disclosure.

FIG. 6 is a flowchart of illustrative steps involved in identifying an event associated with an inconsistent activity. It should be noted that process 600 or any step thereof could be performed on, or provided by, any of the devices shown in FIGS. 3-4. For example, process 600 may be executed by control circuitry 304 (FIG. 3) as instructed by a media guidance application implemented on user equipment 402, 404, and/or 406 (FIG. 4) in order to provide content as described in the displays of FIGS. 1 and 2. In addition, one or more steps of process 600 may be incorporated into or combined with one or more steps of any other process or embodiment (e.g., process 500 (FIG. 5) or process 700 (FIG. 7).

At step 602, the media guidance application receives an activity performed by a user. For example, as discussed above in relation to step 504 (FIG. 5), the media guidance application may monitor the activities of the user (e.g., via control circuitry 304 (FIG. 3)) and extract information about those activities. Furthermore, as described above, the media guidance application (e.g., via control circuitry 304 (FIG. 3)) may extract information about those activities.

At step 604, the media guidance application compares the activity to a user profile. For example, as explained above, data transmitted during an activity may indicate the information (e.g., a genre, subject matter, etc. associated with a media asset) used to compare and compile user preference criteria. Additionally or alternatively, in response to receiving a user request to perform an activity, the media guidance application (e.g., via control circuitry 304 (FIG. 3)) may retrieve/request the information from a database located locally (e.g., storage 308 (FIG. 3)) or a remotely (e.g., located at media guidance data source 418 (FIG. 4) and/or any location accessible via communications network 414 (FIG. 4)) about the activity.

At step 606, the media guidance application determines whether or not the media asset associated with an activity is inconsistent with the profile. For example, as explained above, a database accessible by the media guidance application and located locally (e.g., at storage 308 (FIG. 3)) or a remotely (e.g., located at media guidance data source 418 (FIG. 4) and/or any location accessible via communications network 414 (FIG. 4)) may indicate various types of information used to compare and compile user preference criteria for all available media assets. The media guidance application (e.g., via control circuitry 304 (FIG. 3)) may input the media asset associated with the activity and the database may output a listing of the information. Additionally or alternatively, the media guidance application may retrieve/receive a listing of the user preference criteria associated with the media asset.

Upon retrieval/receipt, the media guidance application (e.g., via control circuitry 304 (FIG. 3)) may compare the information or the user criteria associated with the media asset to the user preference criteria of the user preferences. In response to determining that the user criteria associated with the media asset and the user preference criteria of the user preferences do not correspond, the media guidance application (e.g., via control circuitry 304 (FIG. 3)) may determine that the media asset is inconsistent.

In response to determining that the media asset associated with the activity is inconsistent with the user profile, the media guidance application proceeds to step 608 to determine whether or not the number of times inconsistent activities were performed by the user. In response to determining that the media asset associated with the activity is consistent with the user profile, the media guidance application returns to step 602.

At step 608, the media guidance application determines a number of times inconsistent activities were performed by the user. For example, the media guidance application (e.g., via control circuitry 304 (FIG. 3)) may determine a number of times an inconsistent activity or activities were performed by a user before triggering an identification of an event to ensure that the inconsistent activity or activities were not the result of a user error, but were in fact the result of a change in user preferences.

At step 610, the media guidance application compares the number of times to a threshold number. For example, the media guidance application (e.g., via control circuitry 304 (FIG. 3)) may receive/retrieve a threshold number that is indicative of a change in user preferences. In some embodiments, the threshold number may be determined based on prior history of the user related to any inconsistent activities, the nature of the inconsistent activity, data received from a remote source, any/or any other data that is indicative of a change in user preferences. Accordingly, the media guidance application may only detect an inconsistency, if the inconsistency appears a particular number of times.

At step 612, the media guidance application determines if the number of times corresponds to the threshold number. If so, the media guidance proceeds to step 620 and identifies an event. If not, the media guidance application proceeds to step 614. At step 614, the media guidance application determines a length of time the inconsistent activities were performed by the user. For example, the media guidance application (e.g., via control circuitry 304 (FIG. 3)) may determine a length of time an inconsistent activity or activities were performed by a user before triggering an identification of an event to ensure that the inconsistent activity or activities were not the result of a user error, but were in fact the result of a change in user preferences.

At step 616, the media guidance application compares the length of time to a threshold length. For example, the media guidance application (e.g., via control circuitry 304 (FIG. 3)) may receive/retrieve a threshold length that is indicative of a change in user preferences. In some embodiments, the threshold length may be determined based on prior history of the user related to any inconsistent activities, the nature of the inconsistent activity, data received from a remote source, any/or any other data that is indicative of a change in user preferences. Accordingly, the media guidance application may only detect an inconsistency, if the inconsistency appears over a particular length of time.

At step 618, the media guidance application determines if the length of time corresponds to the threshold length. If so, the media guidance proceeds to step 620 and identifies an event. If not, the media guidance application returns to step 602. For example, in some embodiments, even if the media guidance application (e.g., via control circuitry 304 (FIG. 3)) determines a media asset associated with an activity is inconsistent with a user profile or user preferences, the media guidance application may also require the inconsistent activity to be done a particular number of times or for a particular length of time before triggering an identification of an event to ensure that the inconsistent activity or activities were not the result of a user error, but were in fact the result of a change in user preferences.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one of more of the steps in FIG. 6.

FIG. 7 is a flowchart of illustrative steps involved in updating user viewing preferences based on events. It should be noted that process 700 or any step thereof could be performed on, or provided by, any of the devices shown in FIGS. 3-4. For example, process 700 may be executed by control circuitry 304 (FIG. 3) as instructed by a media guidance application implemented on user equipment 402, 404, and/or 406 (FIG. 4) in order to provide content as described in the displays of FIGS. 1 and 2. In addition, one or more steps of process 700 may be incorporated into or combined with one or more steps of any other process or embodiment (e.g., process 600 (FIG. 6) or process 700 (FIG. 7)).

At step 702, the media guidance application detects an inconsistent activity. For example, as discussed above in relation to step 504 (FIG. 5), the media guidance application (e.g., via control circuitry 304 (FIG. 3)) may detect an inconsistent activity. For example, in addition to monitoring activities of the user, the media guidance application (e.g., via control circuitry 304 (FIG. 3)) may extract information about those activities. For example, data (e.g., metadata) transmitted with a media asset may indicate the information (e.g., a genre, subject matter, etc. associated with the media asset) used to compare and compile user preference criteria. Additionally or alternatively, in response to receiving a user request for a media asset, the media guidance application (e.g., via control circuitry 304 (FIG. 3)) may retrieve/request the information from a database located locally (e.g., at storage 308 (FIG. 3)) or a remotely (e.g., located at media guidance data source 418 (FIG. 4) and/or any location accessible via communications network 414 (FIG. 4)).

At step 704, the media guidance application monitors events of a user within a threshold period of time. For example, in response to detecting an inconsistent activity, the media guidance application (e.g., via control circuitry 304 (FIG. 3)) may monitor events of a user within a threshold period of time. For example, when attempting to identify an event corresponding to an inconsistent activity that occurred, the media guidance application may only process events that occurred within a few days, hours, and/or any other time metric of the inconsistent activity.

In some embodiments, the media guidance application may vary the threshold period of time based on the number of occurrences of the inconsistent activities, the length of time of the inconsistent activities, prior history of the user related to any inconsistent activities, user settings, the nature of the inconsistent activity, any/or any other factor that may bear on determining an event that corresponds to an inconsistent activity.

At step 706, the media guidance application determines whether or not an event was found during the threshold period of time. For example, the media guidance application (e.g., via control circuitry 304 (FIG. 3)) may initially search a small increment of time and gradually expand the search for events to a larger increment of time. Accordingly, if the media guidance application cannot locate an event in the threshold period of time, the media guidance application proceeds to step 708 and adjusts the threshold period of time before returning to step 704.

If an event is found at step 706, the media guidance application proceeds to step 710. At step 710, the media guidance application retrieves data associated with the event. For example, the media guidance application may extract data (e.g., using one or more of the content recognition techniques discussed above) associated with the event (e.g., keywords from a textual posting) that indicate a context or content associated with the event. In such case, the data may be cross-referenced with a database (e.g., located locally at storage 308 (FIG. 3) or remotely at any location accessible via communications network 414 (FIG. 4)) accessible by the media guidance application that indicates potential activities that the event could relate to.

At step 712, the media guidance application determines whether or not the data corresponds to the inconsistent activity. For example, the media guidance application (e.g., via control circuitry 304 (FIG. 3)) may compare the data associated with the event to database with events likely to cause inconsistent activities. For example, if the inconsistent activity is an increase in activities related to wedding planning, the database may indicate likely reasons for the preference change such as the user is recently engaged, the user now shares a user device with another person, etc. In some embodiments, the media guidance application may use fuzzy logic, as discussed above, to compare values in the database with events likely to cause inconsistent activities to keywords founds in the events of the user.

In some embodiments, the media guidance application (e.g., via control circuitry 304 (FIG. 3)) may generate the database listing likely reasons for inconsistent activities in response to determining a threshold number of users each have corresponding activities and corresponding events posted on the server within the threshold period of time of their respective activities. For example, if a larger number of people exhibit a similar viewing preference change near a similar event, the media guidance application (e.g., via control circuitry 304 (FIG. 3)) may determine that the viewing preference change is caused by the event.

After the media guidance application (e.g., via control circuitry 304 (FIG. 3)) determines that the first event corresponds to the inconsistency based on cross-referencing the inconsistency in a database associated with events likely to cause inconsistent activities, the media guidance application (e.g., via control circuitry 304 (FIG. 3)) determines whether the first event corresponds to one of the events likely to cause inconsistent activities. If the media guidance application determines that the data associated with the event does not correspond to the inconsistent activity, the media guidance application returns to step 704. If the media guidance application determines that the data associated with the event corresponds to the inconsistent activity, the media guidance application proceeds to step 714.

At step 714, the media guidance application cross-references the event with database to determine user preference criterion that corresponds to the event. For example, as discussed in relation to FIG. 5, a database (e.g., located locally at storage 308 (FIG. 3) or remotely at any location accessible via communications network 414 (FIG. 4)) accessible by the media guidance application may indicate various types of information used to compare and compile user preference criteria for various events. The media guidance application (e.g., via control circuitry 304 (FIG. 3)) may input the event and the database may output a listing of the information. Additionally or alternatively, the media guidance application may retrieve/receive a listing of the user preference criteria associated with the event.

In some embodiments, the media guidance application may extract data (e.g., using one or more of the content recognition techniques discussed above) associated with the event (e.g., keywords from a textual posting) that indicate a context or content associated with the event. In such case, the data may be cross-referenced with a database (e.g., located locally at storage 308 (FIG. 3) or remotely at any location accessible via communications network 414 (FIG. 4)) accessible by the media guidance application that indicates user preference criteria for various events to determine the user preference criteria associated with the event. For example, if a context of a post to a social media network of a user indicates a new preference for sitcoms, the media guidance application may add a corresponding user preference criterion to the user preferences of the user.

At step 716, the media guidance application updates the viewing preferences for users associated with the event. For example, as described in step 510 (FIG. 5), the media guidance application (e.g., via control circuitry 304 (FIG. 3)) determines the user preference criteria, or lack thereof (e.g., as described above), that caused the media asset associated with the activity to be deemed inconsistent and alters, adds, or removes the determined user preference criteria so that the activity is consistent with the user preferences.

In some embodiments, the media guidance application (e.g., via control circuitry 304 (FIG. 3)) may use correlations determined between an activity and event associated with one user to update user preferences of another user. For example, the media guidance application, in response to identifying a first event, may monitor events posted to a server (e.g., the social media server) by a second user for a second event that corresponds to the first event, and in response to detecting the second event, the media guidance application may update second user preferences with user preference criteria corresponding to the event. For example, after identifying (e.g., via control circuitry 304 (FIG. 3)) an event that indicates that the user preferences for a first user are changing, the media guidance application may monitor other users for the same event.

In some embodiments, the media guidance application (e.g., via control circuitry 304 (FIG. 3)) may only update the viewing preferences for other users if the media guidance application determines that the same event occurred (e.g., based on common keywords associated with both events) with respect to both users. Furthermore, in some embodiments, the media guidance application may only monitor and/or apply changes to the user preferences of other users in response to determining that both users are associated with the same demographic, familial, or social network group.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one of more of the steps in FIG. 7.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time.

It should also be noted, the systems and/or methods described above may be applied to, or used in accordance with, other systems and/or methods.

What is claimed is:

1. A method for detecting a change in user viewing preferences, the method comprising:
   storing first user viewing preferences for a first user;
   detecting an activity performed by the first user that is inconsistent with the first user viewing preferences;
   in response to detecting the activity, identifying a first event, associated with the first user, that is posted on a server within a threshold period of time of the activity, wherein the server makes the first event accessible to a second user;
   determining whether the first event corresponds to the activity by:
      identifying metadata corresponding to the first event,
      extracting a keyword from the metadata, and
      comparing the extracted keyword to a keyword corresponding to the activity;
   in response to determining that the first event corresponds to the activity, determining a user preference criterion based on the first event; and
   updating the first user viewing preferences with the user preference criterion such that the inconsistent activity performed by the first user becomes consistent with the updated first user viewing preferences.

2. The method of claim 1, further comprising generating a display of media content based on the updated first user viewing preferences.

3. The method of claim 1, further comprising:
   in response to identifying the first event, monitoring events posted to the server by the second user for a second event that corresponds to the first event; and
   in response to detecting the second event, updating second user viewing preferences with the user preference criterion.

4. The method of claim 3, wherein the events posted to the server by the second user are monitored in response to determining the first user and the second user are associated with the same demographic, familial, or social network group.

5. The method of claim 3, further comprising determining the second event corresponds to the first event based on similar keywords associated with the second event and the first event.

6. The method of claim 1, wherein the first event is identified in response to determining a threshold number of users each have corresponding activities and corresponding events posted on the server within the threshold period of time of their respective activities.

7. The method of claim 1, further comprising determining that the first event corresponds to the inconsistent activity based on:
   cross-referencing the inconsistent activity in a database associated with events likely to cause inconsistent activities; and
   determining that the first event corresponds to one of the events likely to cause inconsistent activities.

8. The method of claim 7, further comprising cross-referencing the first event with a database associated with user preference criteria to determine the user preference criterion that corresponds to the first event.

9. The method of claim 1, wherein detecting the activity performed by the first user that is inconsistent with the user viewing preferences further comprises:
   determining a number of times the activity was performed by the first user;

comparing the number of times the activity was performed to a threshold number; and identifying the first event in response to determining that the number of times the activity was performed corresponds to the threshold number.

10. The method of claim 1, wherein detecting the activity performed by the first user that is inconsistent with the user viewing preferences further comprises:

determining a length of time during which the activity was performed by the first user;

comparing the length of time during which the activity was performed to a threshold length of time; and identifying the first event in response to determining that the length of time during which the activity was performed corresponds to the threshold length of time.

11. A system for detecting a change in user viewing preferences, the system comprising control circuitry that:

stores first user viewing preferences for a first user;

detects an activity performed by the first user that is inconsistent with the first user viewing preferences;

in response to detecting the activity, identifies a first event, associated with the first user, that is posted on a server within a threshold period of time of the activity, wherein the server makes the first event accessible to a second user;

determines whether the first event corresponds to the activity by:

identifying metadata corresponding to the first event, extracting a keyword from the metadata, and comparing the extracted keyword to a keyword corresponding to the activity;

in response to determining that the first event corresponds to the activity, determines a user preference criterion based on the first event; and updates the first user viewing preferences with the user preference criterion such that the inconsistent activity performed by the first user becomes consistent with the updated first user viewing preferences.

12. The system of claim 11, wherein the control circuitry generates a display of media content based on the updated first user viewing preferences.

13. The system of claim 11, wherein the control circuitry:

in response to identifying the first event, monitors events posted to the server by the second user for a second event that corresponds to the first event; and in response to detecting the second event, updates second user viewing preferences with the user preference criterion.

14. The system of claim 13, wherein the events posted to the server by the second user are monitored in response to determining the first user and the second user are associated with the same demographic, familial, or social network group.

15. The system of claim 13, wherein the control circuitry determines that the second event corresponds to the first event based on similar keywords associated with the second event and the first event.

16. The system of claim 11, wherein the first event is identified in response to determining a threshold number of users each have corresponding activities and corresponding events posted on the server within the threshold period of time of their respective activities.

17. The system of claim 11, wherein the control circuitry determines that the first event corresponds to the inconsistent activity based on:

cross-referencing the inconsistent activity in a database associated with events likely to cause inconsistent activities; and determining that the first event corresponds to one of the events likely to cause inconsistent activities.

18. The system of claim 17, wherein the control circuitry cross-references the first event with a database associated with user preference criteria to determine the user preference criterion that corresponds to the first event.

19. The system of claim 11, wherein the control circuitry that detects the activity performed by the first user that is inconsistent with the user viewing preferences further:

determines a number of times the activity was performed by the first user;

compares the number of times the activity was performed to a threshold number; and identifies the first event in response to determining that the number of times the activity was performed corresponds to the threshold number.

20. The system of claim 11, wherein the control circuitry that detects the activity performed by the first user that is inconsistent with the user viewing preferences further:

determines a length of time during which the activity was performed by the first user;

compares the length of time during which the activity was performed to a threshold length of time; and identifies the first event in response to determining that the length of time during which the activity was performed corresponds to the threshold length of time.

* * * * *